(Model.)
W. J. DONLEY.
Trotting-Sulky.
No. 226,987. Patented April 27, 1880.
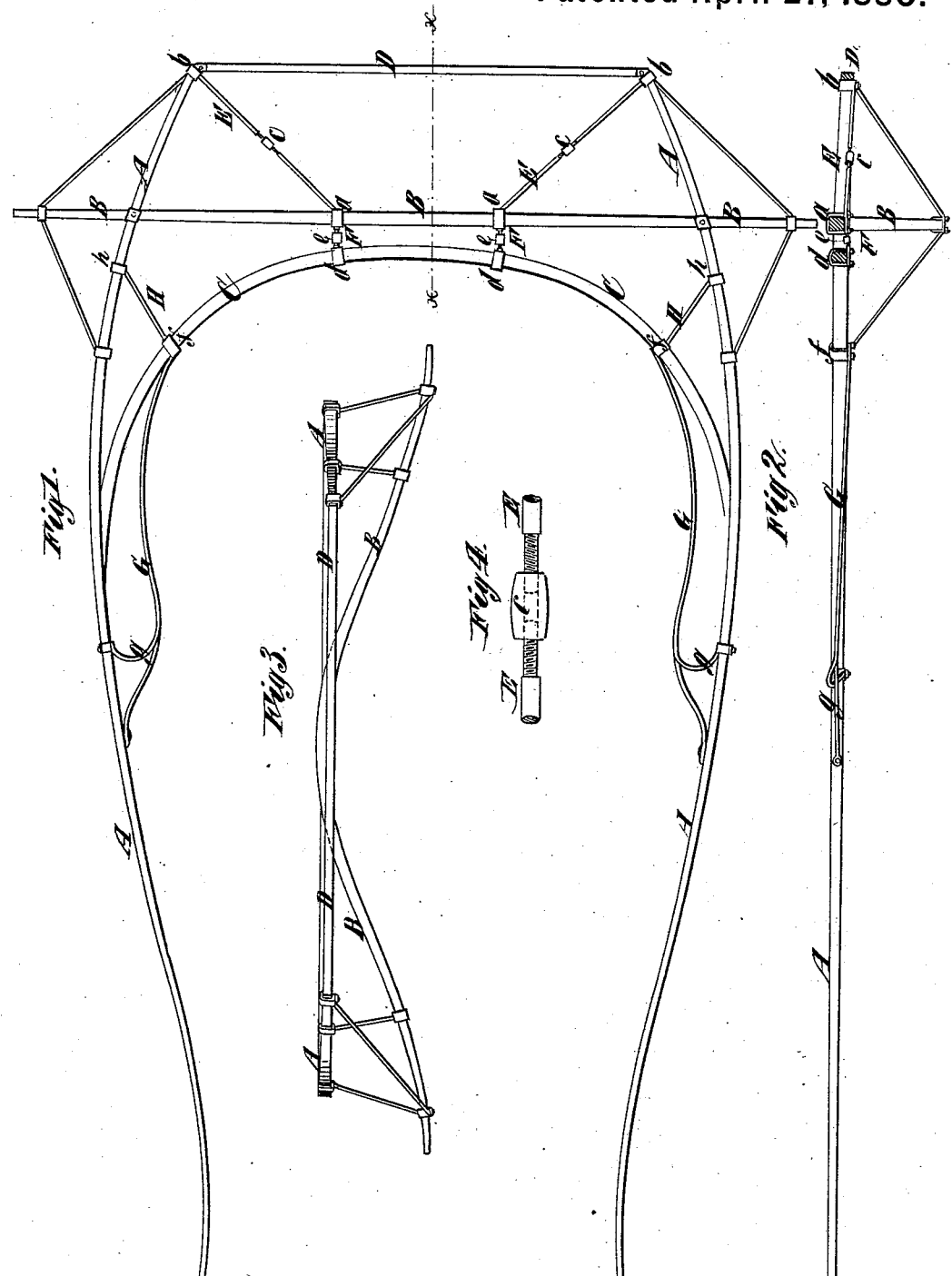
Witnesses
John Becker
Fred Haynes
Inventor
William J. Donley
by his Attorney

UNITED STATES PATENT OFFICE.

WILLIAM J. DONLEY, OF NEW YORK, N. Y.

TROTTING-SULKY.

SPECIFICATION forming part of Letters Patent No. 226,987, dated April 27, 1880.

Application filed March 1, 1880. (Model.)

*To all whom it may concern:*

Be it known that I, WILLIAM J. DONLEY, of New York, in the county of New York and State of New York, have invented certain new and useful Improvements in Trotting-Sulkies, of which the following is a specification.

My invention consists in the combination, with the axle and shafts of a sulky, of brace-rods or diagonal braces which extend from the axle to the back ends of the shafts, the said brace-rods or braces being composed of two pieces connected by coupling-nuts having right and left handed screw-threads for the purpose of lengthening or shortening said braces or brace-rods to regulate the gather of the wheels.

It also consists in the combination, in a sulky, with the axle, shafts, front bar, and the aforesaid brace-rods or diagonal braces, of other braces extending from the axle to the front bar, and likewise composed of sections or pieces adjustable in length by means of screw-threaded coupling-nuts.

In the accompanying drawings, Figure 1 represents a plan view of the frame-work of a sulky embodying my improvements. Fig. 2 represents a longitudinal section thereof on the dotted line *x x*, Fig. 1. Fig. 3 represents an end or rear view of such sulky, and Fig. 4 represents a detail view of the coupling-nut connection for the brace-rods or diagonal.

A A designate the shafts of a trotting or track sulky, and B represents the axle thereof, the wheels not being here represented.

C designates a front bar arranged in front of the axle, and D designates a back bar connecting the back ends of the shafts, all of the aforesaid parts being of ordinary construction and arrangement.

E designates brace-rods or diagonal braces extending from the axle B to the back ends of the shafts A, and secured to the axle and shafts by means of clips *a b*. These braces are composed of two pieces connected by means of coupling-nuts *c*, having internal right and left hand screw-threads, the ends of the rods being correspondingly screw-threaded, as clearly shown in Fig. 4, and by turning said nuts the said rods or braces may be lengthened to regulate the gather of the wheels.

The braces E are preferably combined with other braces, F, which extend from the axle B to the front bar, C, and which are represented as connected at one end to the clips *a* upon the axle and at the other end to clips *d* upon the said front bar. The braces F, like the braces E, are composed of two pieces, united by screw-threaded coupling-nuts *e*, so as to admit of their adjustment similarly to the braces E. They are shown as connected with the axle by the same clips, *a*, which connect the braces E; but the two sets of braces E and F may be separately connected with the axle by any suitable means.

In order to lengthen the braces F the braces E must be shortened, and in order to lengthen the braces E the braces F should be shortened. By the lengthening and shortening of these braces the gather of the wheels may be accurately and easily regulated, and the space between the points of the shafts may be widened or contracted at pleasure, the lengthening of all the said braces having the effect of widening, and the shortening of them having the contrary effect. The tightening up of these braces by their respective nuts has the effect of stiffening the whole frame and of sustaining the axle in its true and proper position.

G designates the foot-rests, one end of which is connected to the front bar, C, by means of clips *f*, and the other ends, *g*, of which are divided and connected to the shaft.

H designates braces extending from the front bar, C, to the shafts A, connected at one end to the clips *f* upon the front bar and at the other ends to the clips *h* upon the shafts. The braces relieve the front bar of the strain brought upon the foot-rests and add greatly to the rigidity of the frame-work of the sulky.

I do not here claim of themselves the brace-rods F F, composed of two pieces connected by coupling-nuts, as they are the subject of my Letters Patent No. 196,412; but

What I claim as my invention, and desire to secure by Letters Patent, is—

1. The combination, with the axle and shafts of a sulky, of the diagonal braces E, each made in two pieces connected by a screw-threaded coupling-nut, c, substantially as and for the purpose specified.

2. The combination, with the axle and shafts, of the braces F, composed of two pieces connected by a coupling-nut, e, and the braces E, also composed of two pieces connected by the coupling-nuts c, substantially as and for the purpose specified.

WM. J. DONLEY.

Witnesses:
    FREDK. HAYNES,
    T. J. KEANE.